United States Patent [19]

Lynch et al.

[11] Patent Number: 6,009,511
[45] Date of Patent: *Dec. 28, 1999

[54] APPARATUS AND METHOD FOR TAGGING FLOATING POINT OPERANDS AND RESULTS FOR RAPID DETECTION OF SPECIAL FLOATING POINT NUMBERS

[75] Inventors: Thomas W. Lynch, Austin, Tex.; Ashraf Ahmed, San Jose, Calif.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/873,340

[22] Filed: Jun. 11, 1997

[51] Int. Cl.$^6$ ........................................... G06F 7/38
[52] U.S. Cl. .......................... 712/222; 708/520; 708/586
[58] Field of Search ...................... 395/563; 364/736.5, 364/748.01, 748.17; 712/222; 708/520, 570, 586

[56] References Cited

U.S. PATENT DOCUMENTS 4,044,338 8/1977 Wolf .
4,453,212 6/1984 Gaither et al. .

(List continued on next page.)

FOREIGN PATENT DOCUMENTS 0 207 519 7/1986 European Pat. Off. .
0259095 3/1988 European Pat. Off. .

(List continued on next page.)

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step!," PC Magazine, Sep. 12, 1995, 16 pages.
Tom R. Halfhill, "AMD K6 Takes On Intel P6," BYTE, Jan. 1996, 4 pages.
Pentium Processor User's Manual vol. 3: Architecture and Programming Manual, Intel 1993, pp. 6–12 through 6–14.
IBM Technical Disclosure Bulletin, "Floating Point Data Type Tag," vol. 39, No. 7, Jul. 1996, pp. 265 (1 sheet).
International Search Report for PCT/US 98/10176 dated Aug. 21, 1998.

Primary Examiner—Meng-Ai T. An
Assistant Examiner—Gautam R. Patel
Attorney, Agent, or Firm—Conley, Rose, & Tayon; Lawrence J. Merkel; B. Noel Kivlin

[57] ABSTRACT

A superscalar microprocessor appends a tag value to each floating point number. The tag value indicates whether the corresponding floating point number is a normal floating point number or a special floating point number. Additionally, the tag value indicates the type of special floating point number represented by the corresponding floating point number. The tag value is stored with the floating point number in a register file of the floating point unit. Tag values are also generated for floating point numbers read from memory. When a floating point core of a floating point unit receives operands from either the register file or memory, the floating point core examines the tag values to determine whether each operand is a normal floating point number or a special floating point number. If either operand is a special floating point number, the floating point core determines the type of special floating point number and applies any applicable special rules. By appending tag values to each floating point number, the floating point unit can quickly determine which floating point numbers are special floating point numbers and the type of special floating point number. This reduces the time necessary to identify floating point numbers and expedites the execution of floating point instructions.

15 Claims, 8 Drawing Sheets

6,009,511

Page 2

U.S. PATENT DOCUMENTS

| | | |
|---|---|---|
| 4,807,115 | 2/1989 | Torng . |
| 4,847,802 | 7/1989 | Ashton ................................ 708/513 |
| 4,858,105 | 8/1989 | Kuriyama et al. . |
| 4,928,223 | 5/1990 | Dao et al. . |
| 4,972,315 | 11/1990 | Yamasaki et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,268,856 | 12/1993 | Wilson ................................ 364/748.2 |
| 5,339,266 | 8/1994 | Hinds et al. ........................ 364/748.13 |
| 5,465,368 | 11/1995 | Davidson et al. . |
| 5,481,489 | 1/1996 | Yanagida ............................. 364/736.5 |
| 5,560,035 | 9/1996 | Garg et al. .............................. 395/568 |
| 5,619,666 | 4/1997 | Coon et al. . |
| 5,657,465 | 8/1997 | Davidson et al. . |
| 5,701,508 | 12/1997 | Glew et al. ........................ 395/800.23 |
| 5,740,441 | 4/1998 | Yellin et al. ............................. 395/704 |
| 5,748,516 | 5/1998 | Goddard et al. .................... 364/748.03 |
| 5,751,981 | 5/1998 | Witt et al. ................................ 395/380 |
| 5,805,475 | 9/1998 | Purino et al. ....................... 364/715.03 |
| 5,825,678 | 10/1998 | Smith ........................................ 341/50 |
| 5,828,873 | 10/1998 | Lynch ...................................... 395/563 |

FOREIGN PATENT DOCUMENTS

| | | |
|---|---|---|
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |
| 85/03148 | 7/1985 | WIPO . |

| Normal 110 | Zero 112 | + Infinity 114 | - Infinity 116 | NaN 118 | DeNorm 120 | Tiny Number 122 | Over-flow 124 | Under-flow 126 | Prec. 128 |

APPARATUS AND METHOD FOR TAGGING FLOATING POINT OPERANDS AND RESULTS FOR RAPID DETECTION OF SPECIAL FLOATING POINT NUMBERS

BACKGROUND OF THE INVENTION

1. Field of the Invention

This invention relates to the field of microprocessors and, more particularly, to tagging floating point values within floating point units of microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessors are configured to operate upon various data types in response to various instructions. For example, certain instructions are defined to operate upon an integer data type. The bits representing an integer form the digits of the number. The binary point is assumed to be to the right of the digits (i.e. integers are whole numbers). Another data type often employed in microprocessors is the floating point data type. Floating point numbers are represented by a mantissa and an exponent. The base for the floating point number is raised to the power of the exponent and multiplied by the mantissa to arrive at the number represented. While any base may be used, base 2 is common in many microprocessors. The mantissa comprises a number of bits used to represent the most significant digits of the number. Typically, the mantissa comprises one bit to the left of the binary point, and the remaining bits to the right of the binary point. The bit to the left of the binary point is not explicitly stored, instead it is implied in the format of the number. Generally, the exponent and the mantissa of the floating point number are stored. Additional information regarding the floating point numbers and operations performed thereon may be obtained in the Institute of Electrical and Electronic Engineers (IEEE) Standard 754. IEEE Standard 754 is herein incorporated by reference in its entirety.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE Standard 754 comprises 32 bits (a one bit sign, 8 bit biased exponent, and 24 bits of mantissa) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Several special floating point data representations are defined. These special floating point data representations are referred to as "special floating point numbers." Special floating point numbers may include special encodings for zero, + and −infinity, denormalized numbers, and not a number (NaN). Specific encodings are assigned for each special floating point number. To determine whether a floating point number is a special floating point number, it is necessary to decode the floating point number to determine if the combination of mantissa and exponent represents a special encoding.

For example, although no combination of mantissa and exponent define a value of infinity, a special encoding is defined to represent infinity. Zero may be represented by a mantissa of zero and any exponent, but this representation would use many encodings to represent zero. For example, a single precision number with an 8-bit exponent would have 64 different encodings would represent zero. To make the maximum utilization of the possible encodings, one special encoding is defined to represent zero. NaN is an encoding that represents a number that is not an ordinary number. For example, the square root of a negative number is a NaN. At least one special encoding is defined to represent a NaN. Another special encoding of a floating point number is for numbers that are denormalized. As noted above, the mantissa typically comprises one bit to the left of the binary point and that bit is implied to be a one. If a number is denormalized, the bit to the left of the binary point is zero rather than one. A denormalized number does not have one specific encoding such as the encodings for zero and infinity. A denormalized number has a series of encodings. For example, an encoding where the exponent is all zeros and the mantissa represents the numerical value of the denormalized number can be used. Denormalized numbers are used to represent floating point values less than the normalized minimum number. For example, in a single precision floating point number, a denormalized number may be used to represent a number less than $1 \times 2^{-126}$.

Special rules for performing floating point operations with special floating point numbers are defined. These special rules may define a specific result for a floating point operation involving special floating point numbers. For example, the result of any operation with an operand that is a NaN is also a NaN. One divided by infinity is zero and one divided by zero is infinity. Additional rules for performing arithmetic operations with special floating point numbers are defined as IEEE Standard 754. Because special rules exist for performing floating point arithmetic operations with special floating point numbers, it is necessary for the floating point unit to decode each floating point operand prior to returning a floating point result. Unfortunately, the additional step of decoding each floating point operand slows down the operation of the floating point arithmetic unit. What is desired is a way to quickly identify a special floating point number.

SUMMARY OF THE INVENTION

The problems outlined above are in large part solved by a floating point unit in accordance with the present invention. A tag value is appended to each floating point number. The tag value identifies special floating point numbers. Additional bits are appended to the register file, or register stack, for storing the tag value. A tag generation circuit generates a tag value when a floating point number is loaded from memory. The floating point unit can quickly determine whether a floating point number is a special floating point number by examining the tag value. The tag value eliminates the need to decode a floating point number each time the number is used in a floating point operation. For example, the tag value stored with a register value identifies whether the corresponding register value is a special floating point number. Additionally, the tag value can be used to eliminate the need for performing a floating point operation. For example, if the tag value of the divisor of a floating point division operation is zero, the quotient of the floating point division operation is, by definition, infinity. Therefore, the actual floating point operation does not need to be performed. The present invention advantageously enables special floating point numbers to be determined without decoding the floating point number and enables the floating point unit to forego the execution of floating point operations involving special floating point numbers.

Broadly speaking, the present invention contemplates a floating point unit for a microprocessor including a register storage device, a memory operand queue, a tag generator circuit, and a floating point core. The register storage device includes a register field configured to store a floating point register value and a tag field configured to store a tag value indicative whether the floating point register value is a special floating point number. The memory operand queue is configured to store a floating point number loaded from memory. The tag generation circuit is coupled to the memory operand queue. The tag generation circuit is configured to generate a tag value indicative of whether the floating point number loaded from memory is a special floating point number. The floating point core is coupled to the register storage device and the tag generation circuit. The floating point core is configured to receive floating point operands from the register storage device or the memory operand queue and to output a floating point result. The floating point core is configured to use the tag values of the floating point operands to determine whether the floating point operands are special floating point numbers.

The present invention further contemplates a method for performing floating point operations on special floating point numbers comprising: storing a tag value with a floating point operand, wherein the tag value is indicative of whether the floating point operand is a special floating point number; examining the tag value stored with the floating point operand to determine whether the floating point operand is a special floating point number; if the floating point operand is not a special floating point number, performing a floating point operation; if the floating point operand is a special floating point number, determining whether special rules apply to the floating point operand; if special rules apply, applying the special rules.

The present invention still further contemplates a microprocessor including an instruction cache, an instruction alignment unit coupled to the instruction cache, a decode unit coupled to the instruction alignment unit, a functional unit coupled to the decode unit, a microcode unit coupled to the instruction cache and the decode unit, and a floating point unit coupled to the microcode unit. The floating point unit includes a register storage device, a memory operand queue, a tag generator circuit, and a floating point core. The register storage device includes a register field configured to store a floating point register value and a tag field configured to store a tag value indicative whether the floating point register value is a special floating point number. The memory operand queue is configured to store a floating point number loaded from memory. The tag generation circuit is coupled to the memory operand queue. The tag generation circuit is configured to generate a tag value indicative of whether the floating point number loaded from memory is a special floating point number. The floating point core is coupled to the register storage device and the tag generation circuit. The floating point core is configured to receive floating point operands from the register storage device or the memory operand queue and to output a floating point result. The floating point core is configured to use the tag values of the floating point operands to determine whether the floating point operands are special floating point numbers.

BRIEF DESCRIPTION OF THE DRAWINGS

Other objects and advantages of the invention will become apparent upon reading the following detailed description and upon reference to the accompanying drawings in which:

FIG. 5 is a diagram of one embodiment of a tag field.

Figure 1:
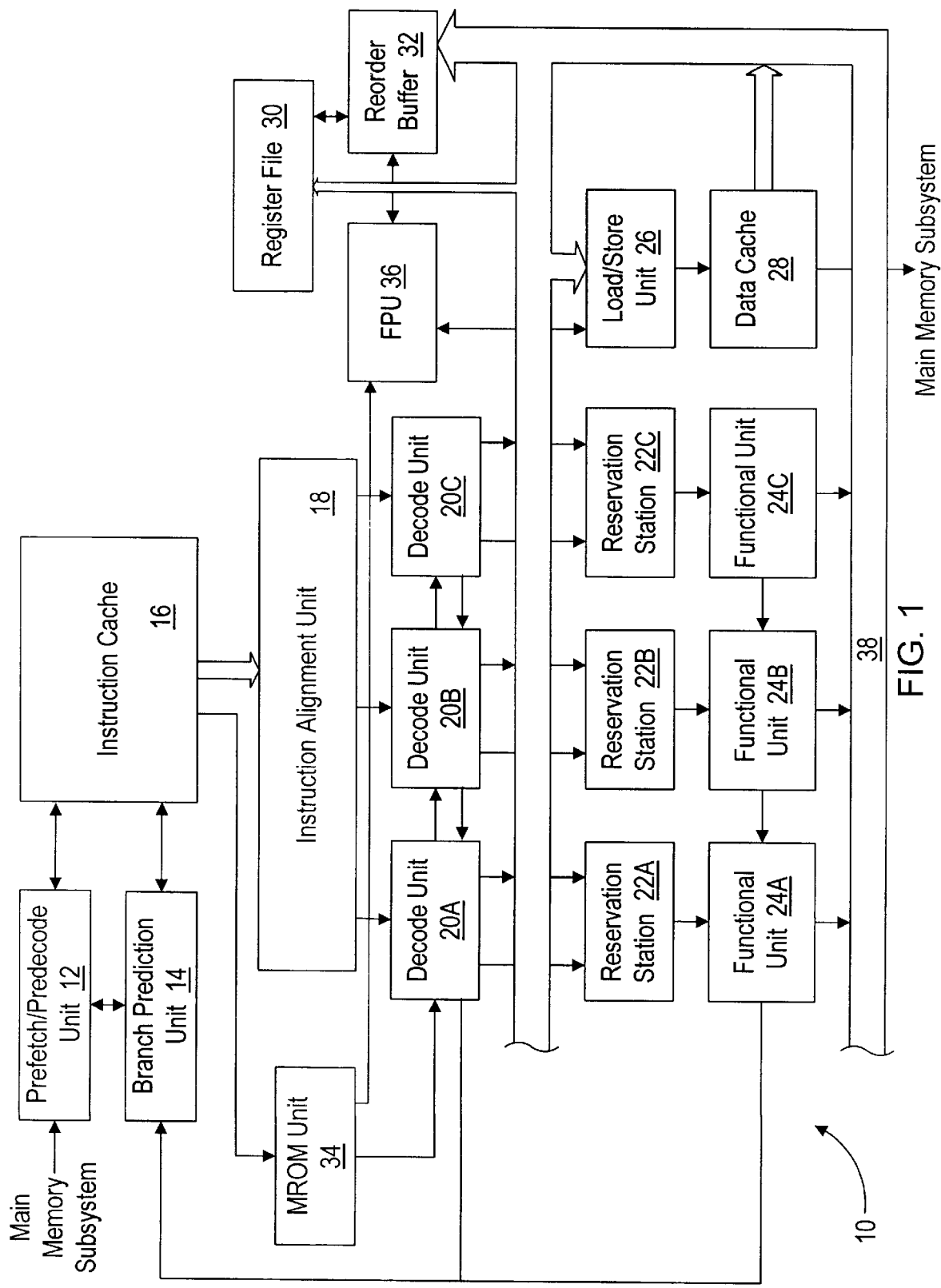
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 parses the floating point instruction into a floating point operation which is transmitted to floating point unit 36 and one or more load/store operations for load/store unit 26 to perform to retrieve memory operands for the instruction. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

A tag value is appended to each floating point number stored in a floating point register or retrieved from memory. The tag value identifies whether the corresponding floating point number is a special floating point number and which type of special floating point number. Prior to performing a floating point operation, the tag value of the operands are examined to identify special floating point numbers. Special rules apply to some floating point operations involving special floating point numbers as operands. If an operand is a special floating point number and a special rule applies, the floating point unit applies to the special rule rather than executing the floating point operation.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. If the MROM instruction is a floating point instruction, the fast path instructions may include a floating point operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
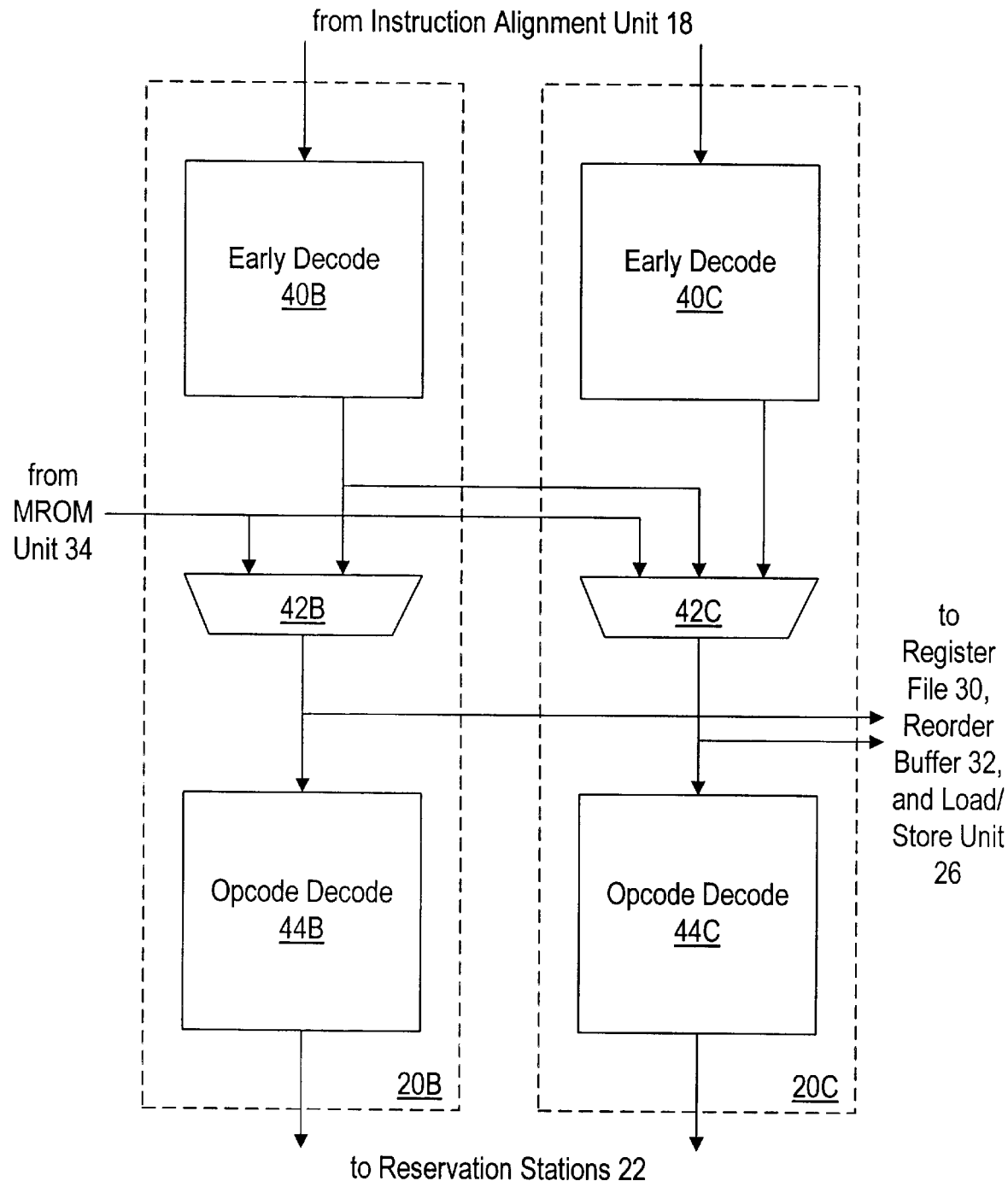
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
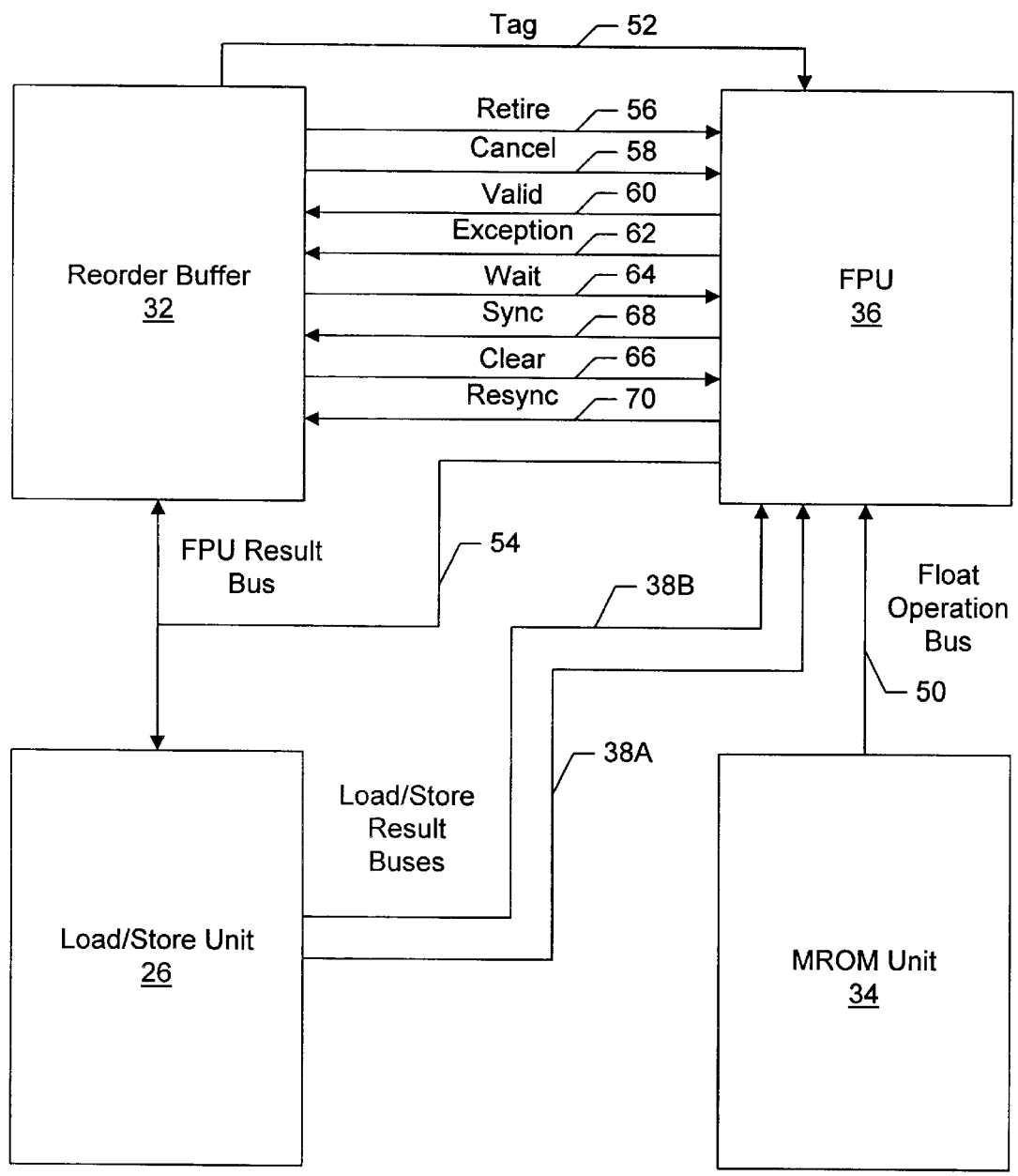
FIG. 3 is a block diagram of a floating point unit, a reorder buffer, a load/store unit, and an MROM unit shown in FIG. 1, highlighting interconnection therebetween according to one embodiment of the microprocessor.

Turning now to FIG. 3, a block diagram of load/store unit 26, reorder buffer 32, FPU 36, and MROM unit 34 is shown. Interconnection between the blocks is highlighted in FIG. 3 according to one embodiment of microprocessor 10. Additional interconnection may be provided as desired according to design choice.

As mentioned above, MROM unit 34 receives floating point instructions from instruction cache 16 and parses the floating point instruction into a floating point operation and memory operations to retrieve and store memory operands for the instructions. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operation upon a float operation bus 50 coupled between MROM unit 34 and FPU 36. The floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag assigned to the memory operations upon a tag bus 52 coupled between reorder buffer 32 and FPU 36. According to the present embodiment, reorder buffer 32 is a line-oriented reorder buffer as described above. For such an embodiment, reorder buffer 32 provides the line tag upon tag bus 52. Using the supplied tag, FPU 36 can identify the memory operand data as it is provided from load/store unit 26.

Load/store unit 26 provides memory operand data upon load/store result bus 38A and 38B. Result buses 38A and 38B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a reorder buffer tag identifying the data word. The reorder buffer tag comprises both the line and offset portions. The line portion identifies the floating point instruction to which the data word belongs, and the offset portion defines the portion of the memory operand being provided by the data word. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 54 to load/store unit 26 for storage. Additionally, a floating point instruction is defined which causes a floating point value to be stored into an integer register (specifically, the AX register of the x86 microprocessor architecture, in one embodiment). FPU result bus 54 is therefore coupled to reorder buffer 32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an interface between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled interface are shown in FIG. 3. A retire signal is conveyed by reorder buffer 32 upon a retire conductor 56 coupled to FPU 36. Reorder buffer 32 conveys a cancel signal upon a cancel conductor 58 coupled to FPU 36. FPU 36 conveys a valid signal upon a valid conductor 60 and an exception signal upon an exception conductor 62, both of which are coupled to reorder buffer 32. Reorder buffer 32 provides a wait signal upon a wait conductor 64 and a clear signal upon a clear conductor 66, both of which are coupled to FPU 36. Finally, FPU 36 provides a sync signal upon a sync conductor 68 and a resync signal upon a resync conductor 70, both of which are coupled to reorder buffer 32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36) via assertion of the cancel signal. FPU 36 may be configured to store an assertion of the retire signal until the corresponding instruction is completed by FPU 36 (i.e. until the instruction exits the execution pipeline of FPU 36). Once the retire signal has been asserted for a given instruction, FPU 36 may proceed with updating the destination register with the result of the instruction (provided certain floating point exceptions are masked).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU 36 deletes any speculative state stored therein.

Figure 4:
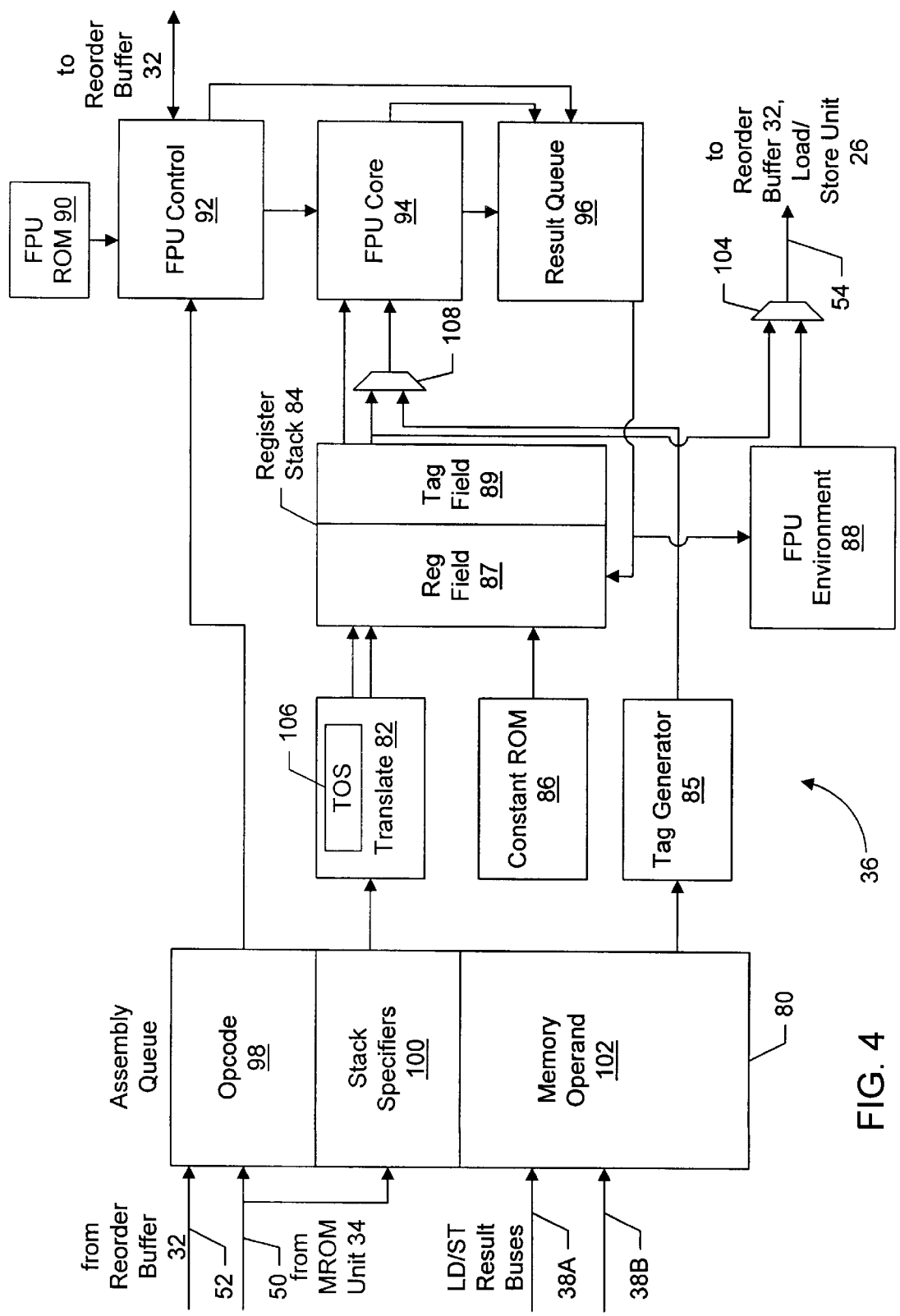
FIG. 4 is a block diagram of one embodiment of a floating point unit shown in FIG. 3.

Turning next to FIG. 4, a block diagram of one embodiment of FPU 36 is shown. As shown in FIG. 4, FPU 36 includes an assembly queue 80, a translate unit 82, a register stack 84, a tag generator 85, a constant read-only memory (ROM) 86, an FPU environment unit 88, an FPU ROM 90, an FPU control unit 92, and FPU core 94, and a result queue 96. Assembly queue 80 comprises multiple queue entries, each of which is configured to store instruction information corresponding to one instruction. As shown in FIG. 4, assembly queue 80 includes several fields for each entry. An opcode field 98 is included for storing the opcode of the floating point instruction and the corresponding reorder buffer tag, and a stack specifiers field 100 is included for storing register specifiers which select storage locations within register stack 84. The selected registers provide operands for the corresponding instructions. The values stored in opcode field 98 and stack specifier field 100 are received by FPU 36 upon float operation bus 50 from MROM unit 34 and tag bus 52 from reorder buffer 32. Assembly queue 80 further includes a memory operand queue 102 for storing a memory operand used by the instruction. The memory operand is received upon load/store result buses 38A and 38B.

Assembly queue 80 is coupled to FPU control unit 92, to translate unit 82, and to tag generator 85. Translate unit 82 is coupled to register stack 84, which is further coupled to constant ROM 86, result queue 96, and FPU core 94. FPU environment 88 is coupled to result queue 96 and is coupled to provide, through multiplexor 104, a result upon FPU result bus 54. Register stack 84 may also provide a result upon FPU result bus 54 through multiplexor 104. FPU control unit 92 is coupled to FPU ROM 90, result queue 96, and FPU core 94. FPU core 94 is further coupled to result queue 96. FPU control unit 92 is further coupled to receive the signals forming the interface between FPU 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. Upon exit from the execution pipeline, the results of the instructions are stored into result queue 96. The results are held in result queue 96 until a retire indication is received from reorder buffer 32. Upon receipt of the retire indication, the results are stored into register stack 84 (or FPU environment 88, if the destination of the instruction is an FPU environment register such as the control word or the status word).

When an instruction is dispatched into the execution pipeline, the stack specifiers for the instruction are conveyed to translate unit 82. In the illustrated embodiment, FPU 36 uses a stack-based register file in which one of the registers is defined to be the top of the stack. In other embodiments, non-stack-based register files may be implemented. Register stack 84 is an example of a register storage device. Generally speaking, a register storage device is any device that includes a plurality of elements capable of latching and holding bits of data. Certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is somewhat dependent upon the instructions which execute prior to that instruction (since these instructions may affect which register is the top of the stack). Translate unit 82 maps the stack specifiers to the registers within register stack 84 based upon a speculative top of stack value which reflects execution of the instructions prior to a particular instruction in program order (including the instructions still within the execution pipeline of FPU 36). A top of stack (TOS) register 106 is included for storing the top of stack indicator. Additionally, a table is provided within translate unit 82 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers.

Register stack 84 includes a register field 87 and a tag field 89. Register field 87 is configured to store a plurality of bits that store a floating point register value. Tag field 89 is configured to store a plurality of bits that store a tag value. Each tag value in tag field 89 is associated with a register value in register field 87. In one embodiment, the tag value stored in tag field 89 indicates whether the floating point register value stored in the associated register field 87 is a normal floating point number or a special floating point number. As noted above, special floating point numbers include zero, +infinity, −infinity, and NaN.

Translate unit 82 provides the translated register specifiers to register stack 84, which reads the values from the corresponding register locations and provides the floating point values and the associated tag values to FPU core 94. Register stack 84 includes the architected FPU registers defined by the microprocessor architecture employed by microprocessor 10. For example, embodiments of microprocessor 10 employing the x86 microprocessor architecture include eight architected registers within register stack 84. Additionally, register stack 84 may include temporary registers for use by floating point microcode routines stored in FPU ROM 90, as described below. In one embodiment, 24 temporary registers are included.

The memory operand for the instruction may be substituted for one of the operands from register stack 84 via multiplexor 108. Memory operand field 102 stores memory operands for floating point instructions. Memory operands are received from load/store result buses 38A and 38B. Memory operands are conveyed to tag generator 85. Tag generator 85 generates a tag value for the memory operand. The tag value, similar to the tag value discussed above in reference to register stack 84, indicates whether the memory operand is a normal floating point number or special floating point number, and which type of special floating point number. A memory operand is conveyed to tag generator 85 when the instruction corresponding to the memory operand is dispatched into the execution pipeline. The memory operand and the tag value associated with the memory operand are conveyed to FPU core 94 via multiplexor 108. In one embodiment, tag generator 85 generates the tag value in parallel with translate unit 82 translating the register specifiers.

FPU core 94 includes the hardware used to manipulate the source operands of the floating point instruction in order to produce the result of the instruction. For example, FPU core 94 includes a multiplier for multiplying the input operands, an adder for adding the input operands, etc. FPU core routes the operands to the various pieces of hardware in response to control signals from FPU control unit 92. FPU control unit 92 receives the opcode for a given instruction from assembly queue 80 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 92 handles the interface to reorder buffer 32 and communicates with other elements of FPU 36 according to communications upon the interface. For example, when a particular instruction receives a retire indication, FPU control unit 92 communicates with result queue 96 to cause the corresponding instruction result to be stored into register stack 84. If the instruction has not yet been completed, result queue 96 queues the retire indication until the instruction is completed.

As noted above, special rules exist for floating point operations involving special floating point numbers. FPU core 94 uses the tag value associated with an operand to determine whether the operand is a special floating point number. FPU core 94 generates a tag value for each result calculated by FPU core 94. The tag value indicates, among other things, whether the operand is a normal floating point number or a special floating point number. In one embodiment, if the operand is a special floating point number, the tag value additionally indicates the type of special floating point number. In one particular embodiment, the tag value contains one bit for each type of special floating point number. Types of special floating point numbers include zero, +infinity, −infinity, and NaNs. By including one bit for each type of special floating point number, FPU core 94 can determine which type of special floating point number the operand represents with minimal decoding.

In one embodiment, certain results of floating point instructions with special floating point numbers as operands are predefined. For example, the quotient of a floating point division operation with zero as the divisor is defined to be infinity. Therefore, several execution pipeline stages may be bypassed when a floating point instruction with a special floating point number as an operand is detected. By monitoring the tag values of the operands, FPU core 94 is able to quickly identify the occurrence and type of a special floating point number. FPU core 94 may be able to use this information to determine the result of the instruction without performing floating point calculations. For example, if FPU core 94 receives a floating point division instruction with infinity as the divisor, FPU core 94 does not have to perform a division operation. The quotient is defined to be zero. Therefore, FPU core 94 can simply load zero from constant ROM 86. Constant ROM 86 is discussed in more detail below.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 90. Effectively, the transcendental instructions make multiple passes through the execution pipeline in order to complete. Intermediate results are calculated by the instructions within the microcoded routine, and the final result is formed by calculating upon the intermediate results.

The microcoded routines may make use of a set of constants stored in constant ROM 86. The constants stored in constant ROM 86 are useful in calculating results for the transcendental instructions. Additionally, the constants may be useful in calculating the results of operations with special floating point numbers as operands. For example, the floating point representations of 1, 0, −1, Pi, etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

FPU environment 88 stores control and status information regarding the state of FPU 36. A control word may be stored which indicates the rounding and precision modes of FPU 36 as well as a mask for various floating point exceptions. A status word may also be stored which indicates which floating point exceptions have been detected, the top of stack pointer, etc.

According to one particular embodiment, FPU 36 executes instructions in program order. The instructions are received into assembly queue 80 in program order, and are provided into the execution pipeline of FPU 36 in program order as well. An instruction may be ready for execution within assembly queue 80 (i.e. all operands provided) but may remain stored therein because another instruction prior the instruction in program order is not ready for execution. In other words, assembly queue 80 operates as a first-in, first-out (FIFO) buffer. Similarly, results are stored from result queue 96 into register stack 84 and/or FPU environment 88 in program order.

Turning next to FIG. 5, one embodiment of a tag value 124 is shown. Tag value 124 includes a plurality of bits. The bit identify whether an associated floating point number is a normal floating point number or a special floating point number. Tag value 124 may includes additional bits to identify the type of special number. Tag value 124 may additionally include bits indicative of other conditions, such as, an overflow or underflow condition, and bits indicating the precision of the associated floating point number. Additional bits and additional types of special floating point numbers may be accommodated as desired according to design choice. In the illustrated embodiment, tag value 124 includes a normal bit 110, a zero bit 112, a +infinity bit 114, a −infinity bit 116, a NaN bit 118, a denormalized number bit 120, an overflow bit, 124, an underflow bit 126, and one or more precision bits 128. In one embodiment, only one of the special floating point number bits of tag value 124 is set at a time. If the floating point number associated with the tag value is a normal floating point number, normal bit 110 is asserted. If the floating point number associated with tag value 124 is a special floating point number, the bit which identifies which type of special floating point number is asserted. In other embodiments, the bits of tag value 124 may be encoded. For example, a 4-bit value can encode the 10 possible states of tag value 124 as illustrated in FIG. 5. A design tradeoff must be made between speed of decoding and number of bits in tag value 124.

Figure 6:
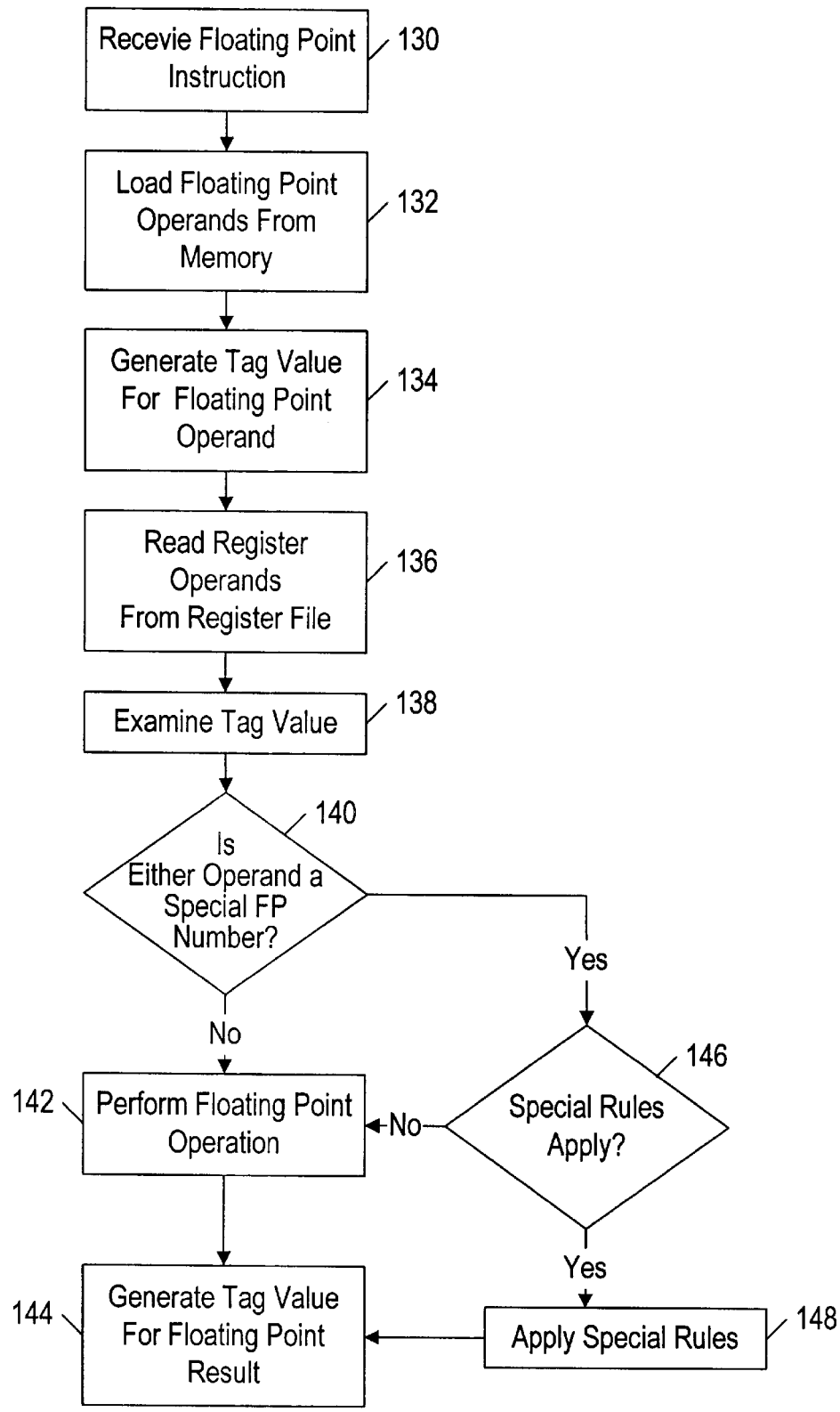
FIG. 6 is a flowchart of the operation of one embodiment of a floating point unit illustrating the handling of special floating point numbers.

Turning now to FIG. 6, a flowchart of the operation of one embodiment of FPU 36 is shown illustrating the handling of special floating point numbers. In step 130, a floating point instruction is received. The floating point instruction may include an opcode, register specifiers and pointers to memory operands. In step 132, floating point memory operands are loaded from memory. Memory operands are received from load/store unit 26 via load/store result buses 38A and 38B. In step 134, a tag value is generated for the memory operands. As noted above, the tag value indicates whether the memory operand is a normal floating point number or a special floating point number. The tag value may additionally indicate the type of special floating point number. In step 136, register operands are read from a register file. In one embodiment, the register operands are stored in a register stack 84. In some floating point instructions, both operands may be read from a register file. In other instructions, both operands may be loaded from memory. In still other floating point instructions, one operand may be read from a register file and the other read from memory. In step 138, the tag values of the floating point operands are examined to determine whether the operands are special floating point numbers. In decisional step 140, it is determined whether each operand is a special floating point number. If neither operand is a special floating point number, then in step 142, the floating point operation specified by the floating point instruction is performed. In step 144, a tag value is generated for the result from floating point operation. If in decisional step 140, either of the operands are determined to be special floating point numbers, then in step 146, it is determined whether special rules apply to the floating point instruction with the determined type of special floating point number as an operand. If no special rules apply, then the floating point operation is performed in step 142 and a tag value is generated in step 144. If in decisional step 146 it is determined that special rules do apply, then in step 148, the special rules are applied and in step 144 a tag value is generated from the result provided by the special rule.

Figure 7:
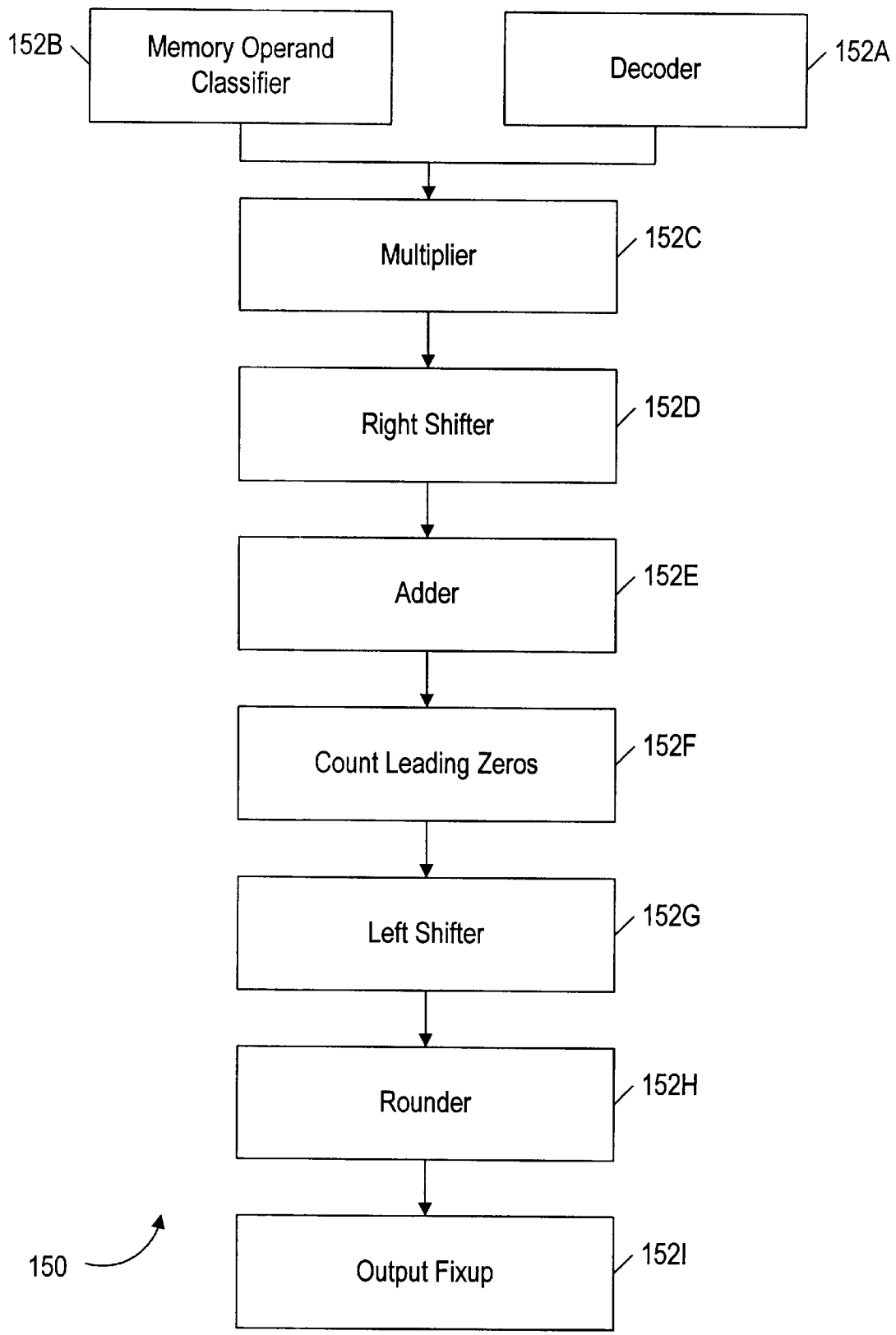
FIG. 7 is a pipeline diagram of one embodiment of the floating point unit shown in FIG. 4.

Turning next to FIG. 7, an exemplary execution pipeline 150 which may be employed by one embodiment of FPU 36 is shown. Other embodiments of FPU 36 may employ any number of pipeline stages and may divide the floating point functionality among the stages in any desirable fashion.

Pipeline 150 includes stages 152A–152I. A given instruction may skip one or more pipeline stages if the instruction does not require any of the hardware at the skipped stage. For example, a floating point addition does not require multiplication, and therefore may skip pipeline stage 152C, or a floating operation with a special floating point number as an operand may have a predetermined result, and therefore skip pipeline stages 152B–152H.

A decoder stage 152A is provided for decoding an opcode of a floating point instruction. The opcode indicates which type of floating point operation to perform. For example, the floating point opcode may indicate specify a floating point addition or a floating point multiplication.

A memory operand classifier stage 152B generates a tag value for operands read from memory. The tag value indicates, among other things, whether the memory operand is a normal floating point number or a special floating point number. If the memory operand is a special floating point number, the tag value may additional indicate what type of special floating number the memory operand represents. In one embodiment, memory operand classifier stage 152B is performed in parallel with decoder stage 152A.

Multiplier stage 152C is used to perform multiplication of floating point numbers. Similarly, right shift stage 152D performs right shift operations. For example, right shift stage 152D may be used to perform the mantissa shift operation described above. Adder stage 152E performs the addition of floating point numbers. Count leading zeros stage 152F is used to count the leading zeros in the result mantissa, in order to place the result into normal form (i.e. one binary digit to the left of the binary point). Left shifter stage 152G left shifts the mantissa according to the number of leading zeros provided by count leading zeros stage 152F, and adjusts the exponent accordingly. Rounder stage 152H rounds the result according to the rounding mode which was conveyed with the corresponding instruction. Finally, output fixup stage 152I is used to force the special encodings (zero, infinity, denormalized number, etc.) if the input operands or the result are special floating point numbers. Output fixup stage 152I additionally sets the tag value to indicate whether the output is a special number. It is noted that, according to one embodiment, rounder stage 152H performs only the rounding of floating point numbers in accordance with the rounding mode conveyed with the instruction. It is noted than many other data paths are possible. For example, the add and round operations may be performed in a single pipeline stage, etc.

It is noted that both FPU control unit 92 and FPU core 94 may implement execution pipeline 150. FPU control unit 92 conveys control information through its pipeline, and FPU core 94 conveys the operand values and intermediate results between the corresponding pipeline stages. Circuitry at each stage in the pipeline of FPU control unit 92 controls the corresponding circuitry within the pipeline of FPU core 94 according to control information for the instruction.

Figure 8:
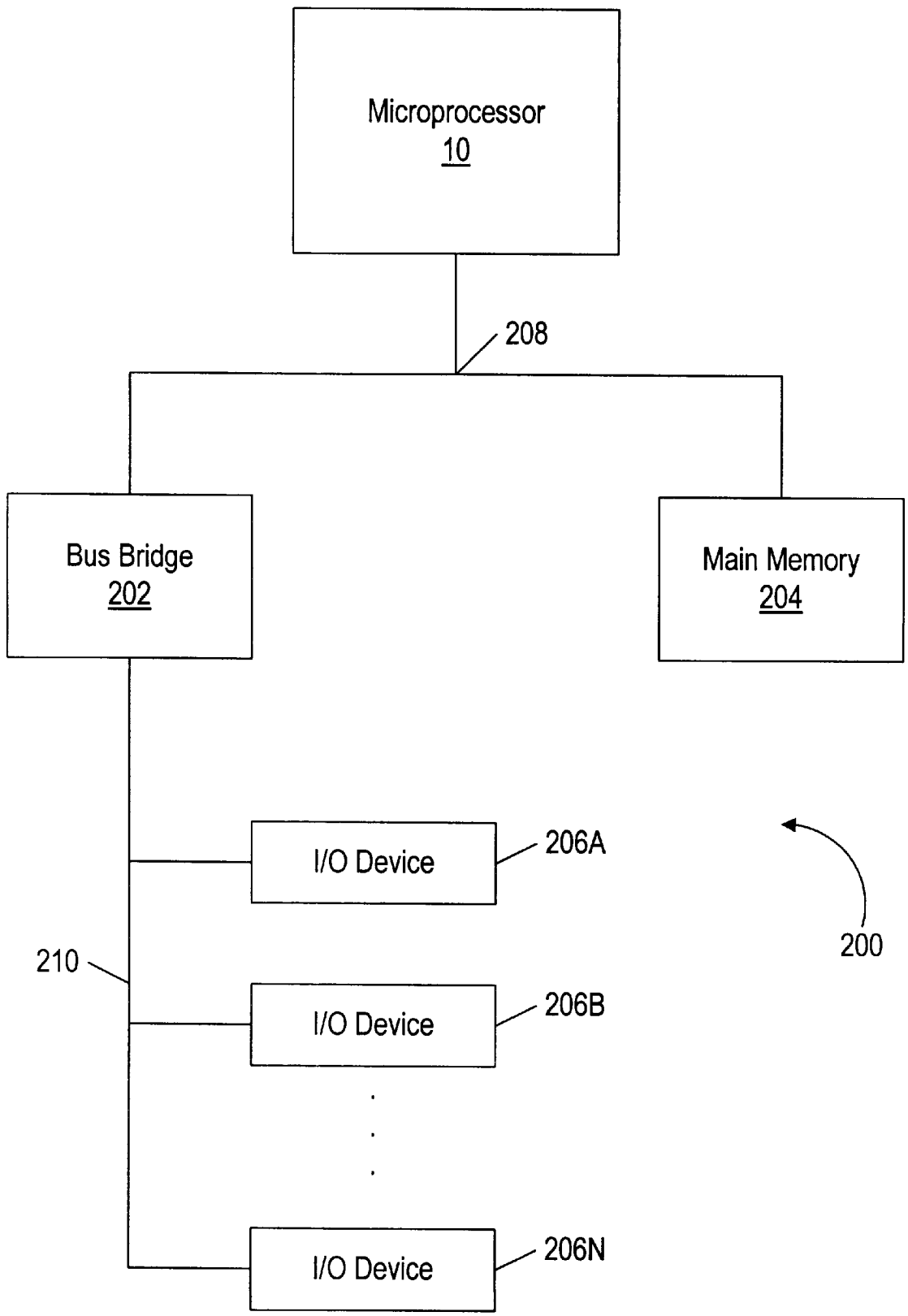
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |

TABLE 1-continued x86 Fast Path, Double Dispatch, and MROM Instructions

| X86 Instruction | Instruction Category |
|---|---|
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |

TABLE 1-continued x86 Fast Path, Double Dispatch, and MROM Instructions

| X86 Instruction | Instruction Category |
|---|---|
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions. Furthermore, floating point instructions are considered to be MROM instructions.

In accordance with the above disclosure, a floating point unit has been shown which appends a tag value to each floating point number. The tag value indicates whether the associated floating point number is a normal floating point number or a special floating point number. Additionally, the tag value may indicate the type of special floating point number. Advantageously, the floating point unit can determine whether a floating point number is a special floating point number and the type of special floating point number without decoding the floating point number. The tag value reduces the time necessary to identify a special floating point number and reduces the time to perform the necessary operation on special floating point numbers.

Numerous variations and modifications will become apparent to those skilled in the art once the above disclosure is fully appreciated. It is intended that the following claims be interpreted to embrace all such variations and modifications.

What is claimed is:

1. A floating point unit for a microprocessor comprising:
    a register storage device including a register field configured to store a floating point register value and a tag field configured to store a first tag value indicative whether said floating point register value is a special floating point number, wherein types of special floating point numbers include zero, infinity, and denormalized numbers;
    a memory operand queue configured to store a floating point number loaded from memory;
    a tag generator coupled to said memory operand queue wherein said tag generator is configured to generate a second tag value indicative of whether said floating point number loaded from memory is a special floating point number; and
    a floating point core coupled to said register storage device and said tag generator wherein said floating point core is configured to receive floating point operands from said register storage device or said memory operand queue and to output a floating point result, wherein said floating point core is configured to use said first or second tag values of said floating point operands to determine whether said floating point operands are special floating point numbers, and wherein said floating point core is configured to generate a third tag value for said floating point result indicative of whether said floating point result is a special floating point number;
    wherein each of said first tag value, said second tag value, and said third tag value includes one bit for each of said types of special floating point number.

2. The floating point unit of claim 1 wherein said floating point core is configured to apply special rules to floating point operands that are special floating point numbers.

3. The floating point unit of claim 2 wherein said special rules obviate the need to perform a floating point arithmetic operation.

4. The floating point unit of claim 1 further comprising an assembly queue coupled to said register storage device, wherein said assembly queue is configured to receive floating point instructions and to store said floating point instructions until corresponding floating point numbers are loaded from memory.

5. The floating point unit of claim 4 wherein said assembly queue includes said memory operand queue and said memory operand queue is configured to store said corresponding floating point numbers loaded from memory.

6. A method for performing floating point operations on special floating point numbers comprising:
    storing a first tag value with a floating point operand, wherein said tag value is indicative of whether said floating point operand is a special floating point number, wherein types of special floating point numbers include zero, infinity, and denormalized numbers, and wherein said first tag value includes one bit for each of said types of special floating point number;
    examining said first tag value stored with said floating point operand to determine whether said floating point operand is a special floating point number;
    performing a floating point operation if said floating point operand is not a special floating point number;
    determining whether special rules apply to said floating point operand if said floating point operand is a special floating point number;
    applying said special rules if said special rules apply; and
    generating a second tag value for a result of said floating point operation, wherein said second tag value includes one bit for each of said types of special floating point number.

7. The method for performing floating point operations on special floating point numbers of claim 6 further comprising:
    loading a floating point operand from memory;
    generating a third tag value for said floating point operand loaded from memory;
    examining said third tag value generated for said floating point operand loaded from memory to determine whether said floating point operand is a special floating point number.

8. The method for performing floating point operations on special floating point numbers of claim 6 further comprising receiving a floating point instruction, wherein said floating point instruction includes an opcode and an operand identifier.

9. A microprocessor comprising:
    an instruction cache;
    an instruction alignment unit coupled to said instruction cache;
    a decode unit coupled to said instruction alignment unit;
    a functional unit coupled to said decode unit;

a microcode unit coupled to said instruction cache and said decode unit; and a floating point unit coupled to said microcode unit, wherein said floating point unit includes:

a register storage device including a register field configured to store a floating point register value and a tag field configured to store a first tag value indicative whether said floating point register value is a special floating point number, wherein types of special floating point numbers include zero, infinity, and denormalized numbers;

a memory operand queue configured to store a floating point number loaded from memory;

a tag generator coupled to said memory operand queue wherein said tag generator is configured to generate a second tag value indicative of whether said floating point number loaded from memory is a special floating point number; and a floating point core coupled to said register storage device and said tag generator wherein said floating point core is configured to receive floating point operands from said register storage device or said memory operand queue and to output a floating point result, wherein said floating point core is configured to determine whether said floating point operands are special floating point numbers by examining said first or second tag values of said floating point operands; wherein said floating point core is configured to generate a third tag value for said floating point result indicative of whether said floating point result is a special floating point number;

wherein each of said first tag value, said second tag value, and said third tag value includes one bit for each of said types of special floating point number.

10. The microprocessor of claim 9 wherein said floating point core is configured to apply special rules to floating point operands that are special floating point numbers.

11. The microprocessor of claim 10 wherein said special rules obviate the need to perform a floating point arithmetic operation.

12. A computer system, comprising:

a microprocessor including:
an instruction cache;
an instruction alignment unit coupled to said instruction cache;
a decode unit coupled to said instruction alignment unit;
a functional unit coupled to said decode unit;
a microcode unit coupled to said instruction cache and said decode unit; and a floating point unit coupled to said microcode unit, wherein said floating point unit includes:

a register storage device including a register field configured to store a floating point register value and a tag field configured to store a first tag value indicative whether said floating point register value is a special floating point number;

a memory operand queue configured to store a floating point number loaded from memory;

a tag generator coupled to said memory operand queue wherein said tag generator is configured to generate a second tag value indicative of whether said floating point number loaded from memory is a special floating point number; and a floating point core coupled to said register storage device and said tag generator wherein said floating point core is configured to receive floating point operands from said register storage device or said memory operand queue and to output a floating point result, wherein said floating point core is configured to determine whether said floating point operands are special floating point numbers by examining said first or second tag values of said floating point operands; wherein said floating point core is configured to generate a third tag value for said floating point result indicative of whether said floating point result is a special floating point number;

wherein each of said first tag value, said second tag value, and said third tag value includes one bit for each of said types of special floating point number; and an input/output (I/O) device coupled to said microprocessor and to another computer system, wherein said I/O device is configured to communicate between said microprocessor and said another computer system.

13. The computer system as recited in claim 12, wherein said I/O device comprises a modem.

14. The computer system as recited in claim 12 further comprising an audio I/O device.

15. The computer system as recited in claim 14 wherein said audio I/O device is a sound card.

* * * * *